(12) United States Patent
Ishibashi et al.

(10) Patent No.: US 12,352,674 B2
(45) Date of Patent: Jul. 8, 2025

(54) TEST METHOD AND METHOD FOR MANUFACTURING SEMICONDUCTOR DEVICE

(71) Applicant: Mitsubishi Electric Corporation, Tokyo (JP)

(72) Inventors: Hidetoshi Ishibashi, Tokyo (JP); Ayumi Minamide, Tokyo (JP); Seiji Oka, Tokyo (JP); Yurie Furuta, Tokyo (JP); Shunji Masumori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/058,623

(22) Filed: Nov. 23, 2022

(65) Prior Publication Data

US 2023/0228661 A1 Jul. 20, 2023

(30) Foreign Application Priority Data

Jan. 17, 2022 (JP) ................................. 2022-005047

(51) Int. Cl.
*G01N 11/02* (2006.01)
(52) U.S. Cl.
CPC .................................. *G01N 11/02* (2013.01)
(58) Field of Classification Search
CPC ........... G01N 11/02; G01N 11/00; G01N 1/02
USPC ......... 73/150 R, 818, 822, 826, 866; 348/61,
348/87, 92, 125, 128, 135
See application file for complete search history.

(56) References Cited

U.S. PATENT DOCUMENTS

2003/0151898 A1 8/2003 Tetsuka et al.

FOREIGN PATENT DOCUMENTS

| CN | 110107591 A | * | 8/2019 | ............ F16C 19/522 |
|---|---|---|---|---|
| GB | 2529458 A | * | 2/2016 | ............ G01N 11/00 |
| JP | S59-188544 A | | 10/1984 | |
| JP | 2004-039829 A | | 2/2004 | |
| JP | 2010-203991 A | | 9/2010 | |
| JP | 2014-106076 A | | 6/2014 | |
| WO | WO-2011066455 A1 | * | 6/2011 | ............ G01N 11/00 |

OTHER PUBLICATIONS

An Office Action; "Notice of Reasons for Refusal," mailed by the Japanese Patent Office on Jul. 9, 2024, which corresponds to Japanese Patent Application No. 2022-005047 and is related to U.S. Appl. No. 18/058,623; with English language translation.
Yasuhisa Fujimoto and Yasumi Uegai, "Evaluation of Pumping Out Phenomenon of Thermal Grease for Semiconductor", vol. 2010, No. 7, Sep. 5-8, 2010, pp. 269-270.

(Continued)

*Primary Examiner* — Robert R Raevis
(74) *Attorney, Agent, or Firm* — Studebaker Brackett PLLC

(57) ABSTRACT

A test method of the present disclosure includes: applying a thermal grease on a support plate; placing a press plate such that the press plate faces the support plate with the thermal grease interposed between the press plate and the support plate; changing a distance between the support plate and the press plate; and observing a shape of the thermal grease after the distance between the support plate and the press plate is changed. The pumping-out performance is determined based on the shape of the thermal grease.

10 Claims, 14 Drawing Sheets

(56) References Cited

OTHER PUBLICATIONS

B. Wunderle et al., "Accelerated Pump Out Testing for Thermal Greases", 2019 20th International Conference on Thermal, Mechanical and Multi-Physics Simulation and Experiments in Microelectronics and Microsystems (EuroSimE), IEEE, Mar. 2019, pp. 1-11, doi: 10.1109/EuroSimE.2019.8724540.

* cited by examiner

TEST METHOD AND METHOD FOR MANUFACTURING SEMICONDUCTOR DEVICE

BACKGROUND OF THE INVENTION

Field of the Invention

The present disclosure relates to a test method and a method for manufacturing a semiconductor device.

Description of the Background Art

A thermal grease applied between a semiconductor package and a heat dissipation fin or the like may pump out. The pumping-out is a phenomenon in which a temperature change of the semiconductor package causes its warp to change, resulting in displacement of the thermal grease from where the thermal grease is intended to be located, and accordingly resulting in loss of a heat dissipating function of the thermal grease.

Japanese Patent Laying-Open No. 2004-039829 discloses a method for determining a pumping-out performance of a thermal grease. According to Japanese Patent Laying-Open No. 2004-039829, a thermal shock test is conducted with the thermal grease interposed between two glass plates, to thereby determine the pumping-out performance of the thermal grease.

SUMMARY OF THE INVENTION

The test method for the pumping-out performance of the thermal grease disclosed in Japanese Patent Laying-Open No. 2004-039829, however, is required to conduct the thermal shock test repeatedly, which makes it difficult to determine the pumping-out performance of the thermal grease in a short time.

The present disclosure is made in view of the problem of the conventional technique as described above. More specifically, the present disclosure provides a test method that enables the pumping-out performance of the thermal grease to be determined in a short time.

A test method of the present disclosure includes: applying a thermal grease on a support plate; placing a press plate such that the press plate faces the support plate with the thermal grease interposed between the press plate and the support plate; changing a distance between the support plate and the press plate; and observing a shape of the thermal grease after the distance between the support plate and the press plate is changed. The pumping-out performance is determined based on the shape of the thermal grease.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
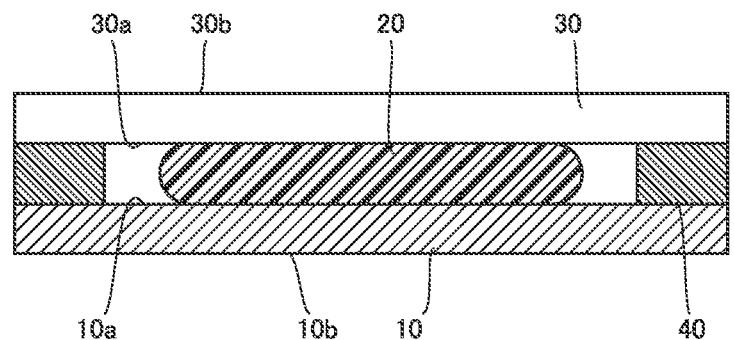
FIG. 1 is a first cross-sectional view generally illustrating a test method according to Embodiment 1.

Details of embodiments of the present disclosure are described with reference to the drawings. In the following drawings, the same or corresponding parts are denoted by the same reference characters, and a description thereof is not herein repeated.

Embodiment 1

A test method according to Embodiment 1 is described.

Determination of Pumping-Out Property Based on Shape of Thermal Grease

FIG. 1 is a first cross-sectional view generally illustrating a test method according to Embodiment 1. As shown in FIG. 1, a support plate 10 is a plate-shaped member. Support plate 10 has a first main surface 10a and a second main surface 10b. First main surface 10a and second main surface 10b are each an end face in the thickness direction of support plate 10. Second main surface 10b is an opposite surface to first main surface 10a.

Support plate 10 is formed from a metal material, for example. Support plate 10 may be formed from glass. Support plate 10 may be selected depending on a semiconductor package for which a thermal grease 20 is to be used. For example, if thermal grease 20 is to be applied on a copper base of a nickel-plated semiconductor package, support plate 10 may be a nickel-plated copper plate.

Thermal grease 20 is located on support plate 10. More specifically, thermal grease 20 is located on first main surface 10a. The shape of thermal grease 20 is a circular shape as seen in plan view, for example. The shape as seen in plan view of thermal grease 20, however, is not limited to this. Thermal grease 20 is a thermal grease of silicone in which a filler is dispersed, for example. Thermal grease 20 is in liquid state at room temperature, for example. Thermal grease 20 may be formed from a phase change thermal interface material (PC-TIM). The phase change thermal interface material is a material in solid state at room temperature and in liquid state at a predetermined temperature or more.

Thermal grease 20 is applied on support plate 10 (first main surface 10a) by being printed through screen printing or the like on support plate 10 (first main surface 10a). When thermal grease 20 is formed from a phase change thermal interface material, thermal grease 20 is applied on support plate 10 by being printed on support plate 10 and volatilizing a solvent.

A press plate 30 is a plate-shaped member. Press plate 30 has a third main surface 30a and a fourth main surface 30b. Third main surface 30a and fourth main surface 30b are each an end face in the thickness direction of press plate 30. Fourth main surface 30b is an opposite surface to third main surface 30a. Press plate 30 is placed to face support plate 10 with thermal grease 20 interposed between press plate 30 and support plate 10. More specifically, press plate 30 is placed such that third main surface 30a faces first main surface 10a with thermal grease 20 interposed therebetween. Press plate 30 is formed from a material transparent to visible light, for example.

A spacer 40 is located between support plate 10 and press plate 30 (between first main surface 10a and third main surface 30a). Spacer 40 maintains the distance between support plate 10 and press plate 30. In other words, spacer 40 enables the thickness of thermal grease 20 to be controlled. Spacer 40 is a shim tape, for example.

Figure 2:
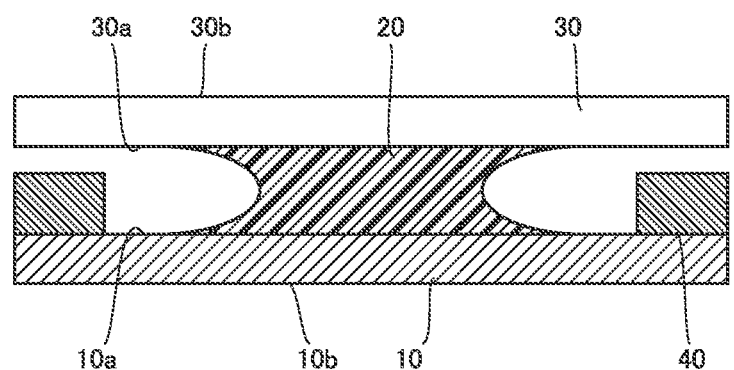
FIG. 2 is a second cross-sectional view generally illustrating the test method according to Embodiment 1.
Figure 3:
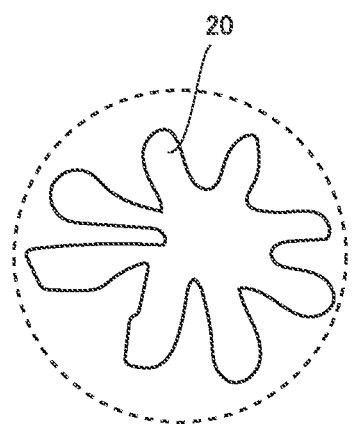
FIG. 3 is a schematic plan view of a thermal grease 20 when a press plate 30 is moved such that the distance between a support plate 10 and press plate 30 is increased.

FIG. 2 is a second cross-sectional view generally illustrating the test method according to Embodiment 1. FIG. 3 is a schematic plan view of thermal grease 20 when press plate 30 is moved such that the distance between support plate 10 and press plate 30 is increased. In FIG. 3, the shape of thermal grease 20 before being deformed is indicated by a dotted line. As shown in FIGS. 2 and 3, when press plate 30 is moved to increase the distance between support plate 10 and press plate 30 (distance between first main surface 10a and third main surface 30a), thermal grease 20 is stretched and accordingly the shape of thermal grease 20 as seen in plan view is changed.

The shape of thermal grease 20 as seen in plan view is observed through press plate 30 in a direction orthogonal to first main surface 10a. The shape of thermal grease 20 as seen in plan view is influenced by ease of deformation (or resistance to deformation) of thermal grease 20. In view of this, the shape as seen in plan view of thermal grease 20 after press plate 30 is moved is observed to thereby determine the pumping-out performance of thermal grease 20.

Figure 4:
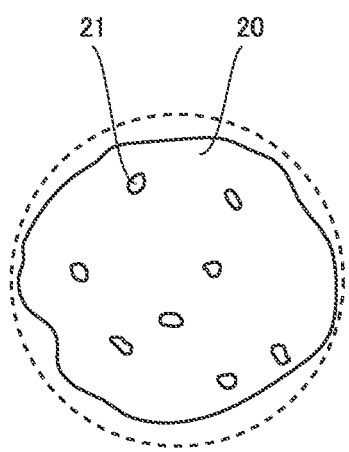
FIG. 4 is a schematic plan view of thermal grease 20 when press plate 30 is moved, from the state shown in FIG. 3, such that the distance between support plate 10 and press plate 30 is decreased.

FIG. 4 is a schematic plan view of thermal grease 20 when press plate 30 is moved, from the state shown in FIG. 3, such that the distance between support plate 10 and press plate 30 is decreased. In FIG. 4, the shape of thermal grease 20 before being deformed is indicated by a dotted line. As shown in FIG. 4, a void(s) 21 is formed in thermal grease 20, after press plate 30 is moved such that the distance between support plate 10 and press plate 30 is once increased and thereafter decreased. The size and/or the number of voids 21 is measured to determine the pumping-out performance of thermal grease 20. In the state shown in FIG. 4, press plate 30 has been returned to its initial position.

In the example shown in FIG. 3, the pumping-out performance of thermal grease 20 is determined, based on the shape of thermal grease 20 after press plate 30 is moved such that the distance between support plate 10 and press plate 30 is increased. The pumping-out performance of thermal grease 20 may also be determined, based on the shape of thermal grease 20 after press plate 30 is moved such that the distance between support plate 10 and press plate 30 is decreased.

In the example shown in FIG. 4, the pumping-out performance is determined, based on the shape of thermal grease 20 after press plate 30 is moved such that the distance between support plate 10 and press plate 30 is once increased and thereafter decreased. The combination of the directions in which press plate 30 is moved, however, is not limited to the example shown in FIG. 4. Specifically, the combination of the directions in which press plate 30 is moved and/or the distance for which press plate 30 is moved may be selected appropriately depending on properties of thermal grease 20.

Figure 5:
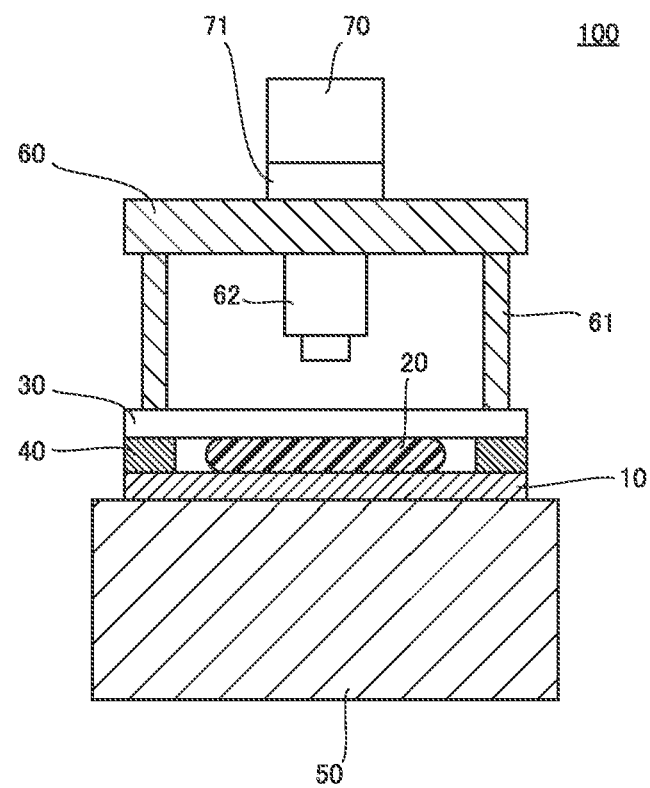
FIG. 5 is a schematic diagram of a test apparatus 100 to be used for the test method according to Embodiment 1.

Evaluation of Pumping-Out Property Based on Change of Load Applied to Press Plate FIG. 5 is a schematic diagram of a test apparatus 100 to be used for the test method according to Embodiment 1. As shown in FIG. 5, test apparatus 100 includes support plate 10, press plate 30, a temperature adjuster 50, an attachment jig 60, and a drive unit 70. As described above, thermal grease 20 is interposed between support plate 10 and press plate 30. Spacer 40 may be also be placed between support plate 10 and press plate 30.

Support plate 10 is located on temperature adjuster 50. Second main surface 10b faces temperature adjuster 50. Temperature adjuster 50 is configured to adjust the temperature of support plate 10. Thus, in an environment simulating a temperature increase of a semiconductor package, the pumping-out performance of thermal grease 20 can be determined. Temperature adjuster 50 is a hot plate, for example. Temperature adjuster 50, however, is not limited to this. Temperature adjuster 50 may be configured to cool support plate 10 by means of water cooling or a Peltier device or the like.

Attachment jig 60 is connected to press plate 30. More specifically, attachment jig 60 is connected to fourth main surface 30b of press plate 30 by means of a rod 61. An imaging device 62 may be attached to attachment jig 60. With imaging device 62, the shape of thermal grease 20 as seen in plan view can be observed through press plate 30. Imaging device 62 is a digital camera, for example.

With test apparatus 100 including imaging device 62, a change in shape of thermal grease 20 and/or the size and the number of voids 21 thereof may be measured by performing image processing on an image of thermal grease 20 obtained through imaging device 62. This image processing is binarization processing performed on an image obtained through imaging device 62, for example. With test apparatus 100 including no imaging device 62, a change in shape of thermal grease 20 and/or the size and the number of voids 21 thereof may be observed through visual check.

Drive unit 70 is connected to attachment jig 60. Drive unit 70 moves press plate 30 through attachment jig 60 such that the distance between support plate 10 and press plate 30 is changed. A load applied to press plate 30 is measured by a load sensor 71 attached to drive unit 70. For test apparatus 100 including drive unit 70, spacer 40 may not be placed between support plate 10 and press plate 30.

Figure 6:
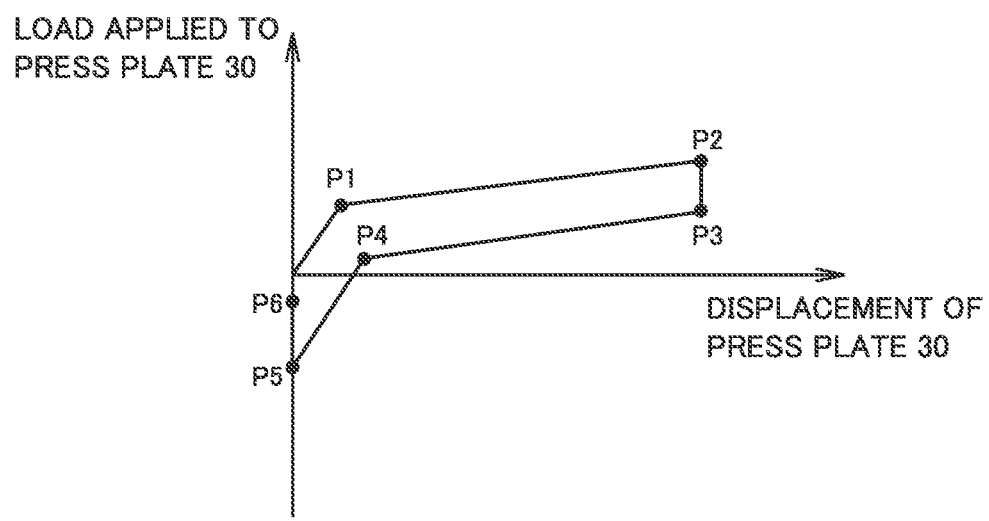
FIG. 6 is a schematic graph showing a relation between displacement of press plate 30 and load applied to press plate 30.

FIG. 6 is a schematic graph showing a relation between displacement of press plate 30 and load applied to press plate 30. The horizontal axis of the graph in FIG. 6 represents displacement of press plate 30, and the vertical axis of the graph in FIG. 6 represents load applied to press plate 30.

A state where press plate 30 is located between the origin and position P1 in FIG. 6 is herein referred to as first state. A state where press plate 30 is located between position P1 and position P2 in FIG. 6 is herein referred to as second state. A state where press plate 30 is located between position P2 and position P3 in FIG. 6 is herein referred to as third state. A state where press plate 30 is located between position P3 and position P4 in FIG. 6 is herein referred to as fourth state. A state where press plate 30 is located between position P4 and position P5 in FIG. 6 is herein referred to as fifth state. A state where press plate 30 is located between position P5 and position P6 in FIG. 6 is herein referred to as sixth state.

Figure 7A:
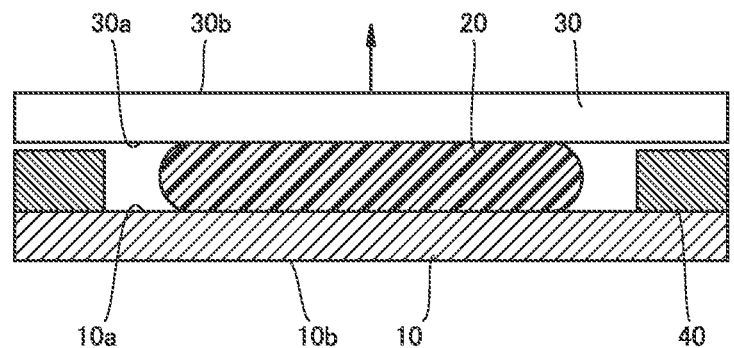
FIG. 7A is a cross-sectional view of thermal grease 20 in a first state.
Figure 7B:
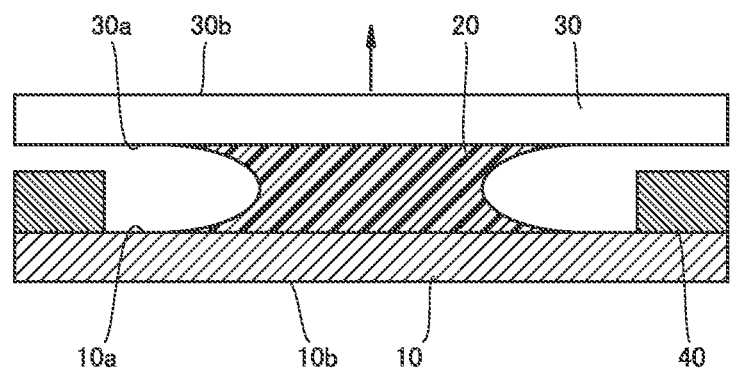
FIG. 7B is a cross-sectional view of thermal grease 20 in a second state.
Figure 7C:
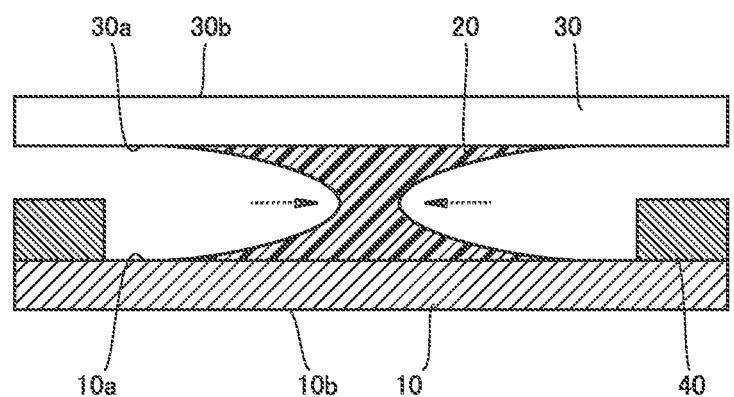
FIG. 7C is a cross-sectional view of thermal grease 20 in a third state.
Figure 7D:
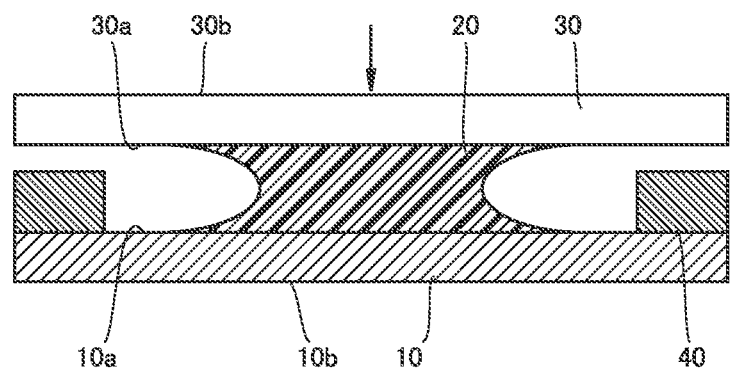
FIG. 7D is a cross-sectional view of thermal grease 20 in a fourth state.
Figure 7E:
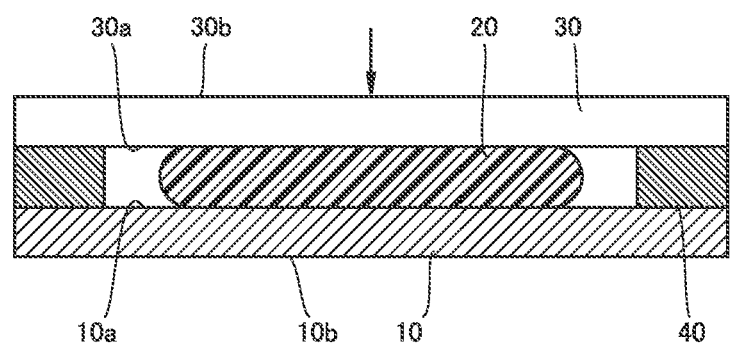
FIG. 7E is a cross-sectional view of thermal grease 20 in a fifth state.
Figure 7F:
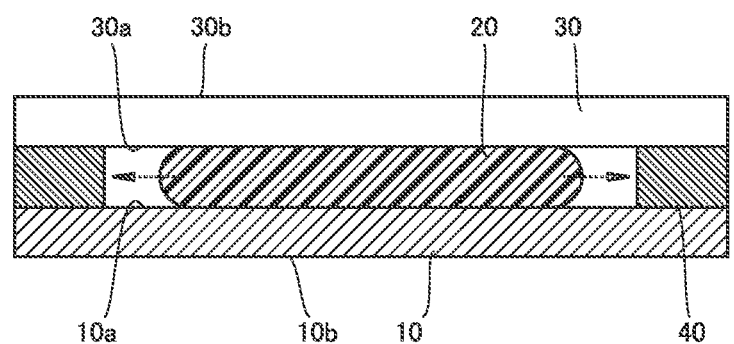
FIG. 7F is a cross-sectional view of thermal grease 20 in a sixth state.

FIG. 7A is a cross-sectional view of thermal grease 20 in the first state. FIG. 7B is a cross-sectional view of thermal grease 20 in the second state. FIG. 7C is a cross-sectional view of thermal grease 20 in the third state. FIG. 7D is a cross-sectional view of thermal grease 20 in the fourth state. FIG. 7E is a cross-sectional view of thermal grease 20 in the fifth state. FIG. 7F is a cross-sectional view of thermal grease 20 in the sixth state.

For the first state as shown in FIGS. 6 and 7A, drive unit 70 moves press plate 30 away from spacer 40. At this time, load sensor 71 detects the self-weight of press plate 30 and/or attachment jig 60.

For the second state as shown in FIGS. 6 and 7B, drive unit 70 moves press plate 30 such that the distance between support plate 10 and press plate 30 is increased. At this time, as the displacement of press plate 30 is increased, the load applied to press plate 30 is increased. If thermal grease 20 is a material that is easily deformable, the force of thermal grease 20 pulling press plate 30 is smaller, and therefore, the gradient between position P1 and position P2 of the graph in FIG. 6 decreases. In contrast, if thermal grease 20 is a material that is resistant to deformation, the force of thermal grease 20 pulling press plate 30 is larger, and therefore, the gradient between position P1 and position P2 of the graph in FIG. 6 increases. Thus, based on the gradient between position P1 and position P2 of the graph in FIG. 6, the pumping-out property of thermal grease 20 can be determined.

For the third state as shown in FIGS. 6 and 7C, drive unit 70 maintains the position of press plate 30. If deformation of thermal grease 20 cannot respond to the moving speed of press plate 30, the shape of thermal grease 20 is changed while thermal grease 20 is left as it is and the force of thermal grease 20 pulling press plate 30 is reduced gradually. Based on this behavior as well, the ease of deformation (or resistance to deformation) of thermal grease 20 can be identified, and therefore, the pumping-out property of thermal grease 20 can be determined.

For the fourth state as shown in FIGS. 6 and 7D, drive unit 70 moves press plate 30 such that the distance between support plate 10 and press plate 30 is decreased. At this time, as the displacement of press plate 30 is decreased, the load applied to press plate 30 is decreased. In the fourth state, a behavior generally opposite to the second state is exhibited, and therefore, based on the gradient between position P3 and position P4 of the graph in FIG. 6, the pumping-out property of thermal grease 20 can be determined.

For the fifth state as shown in FIGS. 6 and 7E, drive unit 70 moves press plate 30 such that the distance between support plate 10 and press plate 30 is further decreased. At this time, the filler or the like inside thermal grease 20 is compressed to increase a shear force inside thermal grease 20, resulting in repulsive force applied against press plate 30. Depending on the size and/or ease of deformation of the filler inside thermal grease 20, the gradient between position P4 and position P5 of the graph in FIG. 6 changes. Therefore, based on the gradient between position P4 and position P5 of the graph in FIG. 6, the pumping-out property of thermal grease 20 can be determined.

For the sixth state as shown in FIGS. 6 and 7F, drive unit 70 maintains the position of press plate 30. The aforementioned repulsive force is reduced with time, as the filler and/or resin inside thermal grease 20 moves. Based on this behavior as well, the pumping-out property of thermal grease 20 can be determined. Thus, based on the gradient of the load change in the second state, the gradient of the load change in the fourth state, the gradient of the load change in the fifth state, the load change with time in the third state, and the load change with time in the sixth state, the pumping-out property of thermal grease 20 can be determined.

The pumping-out property of thermal grease 20 may be determined based on at least one of the gradient of the load change in the second state, the gradient of the load change in the fourth state, the gradient of the load change in the fifth state, the load change with time in the third state, and the load change with time in the sixth state. The pumping-out property of thermal grease 20 may also be determined based on a combination of two or more of them.

Depending on the moving speed of press plate 30 in the second, fourth, and fifth states, and the time for which press plate 30 is maintained in the third and sixth states, a test conducted on the same thermal grease 20 may give different results. Therefore, depending on properties of thermal grease 20 to be measured, preferably the moving speed of press plate 30 and the time for which press plate 30 is maintained are 1 µm/sec or more and 1 mm/sec or less, and 0 minutes or more and 10 minutes or less, respectively.

When the pumping-out property of thermal grease 20 is determined based on the load applied to press plate 30 when press plate 30 is moved, test apparatus 100 may not include imaging device 62 and press plate 30 may not be formed from a material transparent to visible light. However, even when the pumping-out property of thermal grease 20 is determined based on the load applied to press plate 30 when press plate 30 is moved, test apparatus 100 may include imaging device 62 and/or press plate 30 may be formed from a material transparent to visible light, in order to check whether the test malfunctions or not.

Advantageous Effects

With the test method according to Embodiment 1, the pumping-out property of thermal grease 20 can be determined by applying a single cycle of deformation to thermal grease 20, and therefore, the pumping-out performance of the thermal grease can be determined in a short time.

When the pumping-out property of thermal grease 20 is determined by the test method according to Embodiment 1 by observing the shape, as seen in plan view, of thermal grease 20 after the distance between support plate 10 and press plate 30 is once increased and thereafter decreased, the pumping-out property can be determined quantitatively in a short time based on the size or the number of voids 21. When the shape, as seen in plan view, of thermal grease 20 after press plate 30 is moved is observed with imaging device 62 by the test method according to Embodiment 1, the pumping-out performance of the thermal grease can be determined quantitatively in a short time, through image processing performed on a resultant image.

With the test method according to Embodiment 1, the pumping-out property of thermal grease 20 can be determined based on a change of the load applied to press plate 30 as press plate 30 is moved or press plate 30 is maintained, and therefore, the pumping-out performance of the thermal grease can be determined quantitatively in a short time.

Embodiment 2

A method for manufacturing a semiconductor device according to Embodiment 2 is described. A semiconductor device according to Embodiment 2 is herein referred to as semiconductor device 200.

Figure 8:
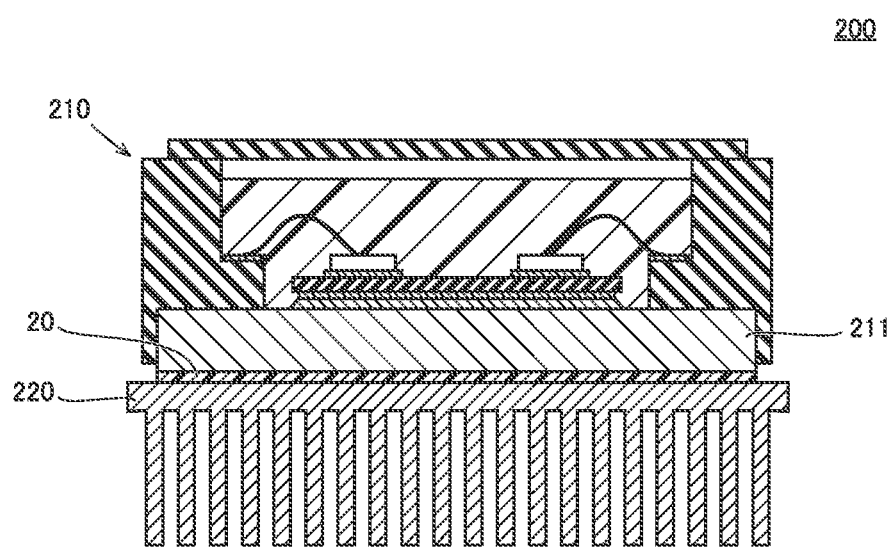
FIG. 8 is a schematic cross-sectional view of a semiconductor device 200.

FIG. 8 is a schematic cross-sectional view of semiconductor device 200. As shown in FIG. 8, semiconductor device 200 includes a semiconductor package 210 and a thermal grease 20. A base 211 is exposed from the back surface of semiconductor package 210. Thermal grease 20 is located on base 211. A heat dissipation fin 220 is attached to semiconductor device 200 after preassembly. Heat dissipation fin 220 is placed on thermal grease 20. Heat generated inside semiconductor package 210 is transmitted through base 211 and thermal grease 20 to heat dissipation fin 220 and released from heat dissipation fin 220.

Figure 9:
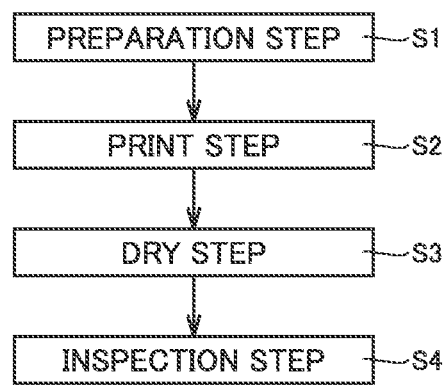
FIG. 9 is a manufacturing flowchart for semiconductor device 200.

FIG. 9 is a manufacturing flowchart for semiconductor device 200. As shown in FIG. 9, a method for manufacturing semiconductor device 200 includes a preparation step S1, a print step S2, a dry step S3, and an inspection step S4. In preparation step S1, semiconductor package 210 is prepared.

In print step S2, thermal grease 20 is printed on the back surface of semiconductor package 210 by means of screen printing, for example. Thermal grease 20 is a phase change thermal interface material, for example. In a stage after print step S2 is performed and before dry step S3 is performed, thermal grease 20 contains a solvent. In dry step S3, the solvent contained in thermal grease 20 is volatilized. In this way, semiconductor device 200 is pre-assembled.

In inspection step S4, inspection of thermal grease 20 located on the back surface of semiconductor package 210 is conducted. More specifically, first, under the same conditions as print step S2 and dry step S3, thermal grease 20 belonging to the same lot as the one used for manufacturing semiconductor device 200 is placed on support plate 10. Second, press plate 30 is disposed to face support plate 10 with thermal grease 20 interposed therebetween, and then the test method according to Embodiment 1 is performed. Whether it passes the inspection or not in inspection step S4 is determined, based on a comparison with a result of a test conducted for thermal grease 20 applied normally on support plate 10. Inspection step S4 may be performed at least once while thermal grease 20 of the same lot is used.

According to the method for manufacturing semiconductor device 200, for semiconductor device 200 in which thermal grease 20 belonging to the same lot is used, thermal grease 20 can be inspected at a time for defective pumping-out performance due to insufficient volatilization of the solvent contained in thermal grease 20, an insufficient content of the filler contained in thermal grease 20, and abnormality of a resin material contained in thermal grease 20, for example.

While the embodiments of the present disclosure are thus described, it should be construed that the embodiments disclosed herein are given by way of illustration in all respects, not by way of limitation. It is intended that the scope of the present disclosure is defined by claims, and encompasses all modifications and variations equivalent in meaning and scope to the claims.

What is claimed is:

1. A test method for determining pumping-out performance of a thermal grease, comprising:
    applying the thermal grease on a support plate;
    observing a shape of the thermal grease a first time;
    placing a plate such that the plate faces the support plate with the thermal grease interposed between the plate and the support plate;
    after observing the shape of the thermal grease the first time, changing a distance to at least increase the distance between the support plate and the plate;
    observing a shape of the thermal grease a second time after the distance is changed while the plate is at the changed distance from the support plate, the changed distance being different from a distance between the plate and the support plate before the changing the distance, and
    determining pumping-out performance of the thermal grease based on a change in the shape of the thermal grease between the shape observed at the first time and the shape observed at the second time.

2. The test method according to claim 1, wherein the observing the shape of the thermal grease a second time comprises observing the shape of the thermal grease after the distance between the support plate and the plate is changed to once increase and then decrease.

3. The test method according to claim 2, wherein the pumping-out performance is determined based on the shape after the distance is changed to once increase and once decrease without additional changes in the distance.

4. The test method according to claim 1, wherein
    the plate is formed from a material transparent to visible light, and
    the shape is observed through the plate.

5. A test method for determining pumping-out performance of a thermal grease, comprising:
    applying the thermal grease on a support plate;
    placing a plate such that the plate faces the support plate with the thermal grease interposed between the plate and the support plate;
    changing a distance between the support plate and the plate;
    measuring a load applied to the plate; and
    determining the pumping-out performance based on a change of the load.

6. The test method according to claim 5, wherein the pumping-out performance is determined based on a change of the load as the distance is changed.

7. The test method according to claim 5, wherein the pumping-out performance is determined based on a change of the load as the distance is changed and then maintained.

8. The test method according to claim 5, wherein the pumping-out performance is determined based on a change of the load as the distance is changed in a first direction and then maintained and the distance is changed in a second direction opposite to the first direction and then maintained.

9. A method for manufacturing a semiconductor device, the method comprising,
    preparing a semiconductor package;
    applying a thermal grease on the semiconductor package; and
    conducting an inspection of a pumping-out performance of thermal grease belonging to a same lot as the thermal grease applied to the semiconductor package, wherein the inspection is conducted in accordance with the test method according to claim 1, and the thermal grease belonging to the same lot as the thermal grease applied to the semiconductor package is applied on the support plate under a condition identical to a condition under which the thermal grease is applied on the semiconductor package.

10. The method for manufacturing a semiconductor device according to claim 9, wherein the thermal grease is formed from a phase change thermal interface material.

\* \* \* \* \*